No. 784,465. PATENTED MAR. 7, 1905.
W. ANDERSON.
DUMPING TRAP.
APPLICATION FILED DEC. 19, 1903.
2 SHEETS—SHEET 1.
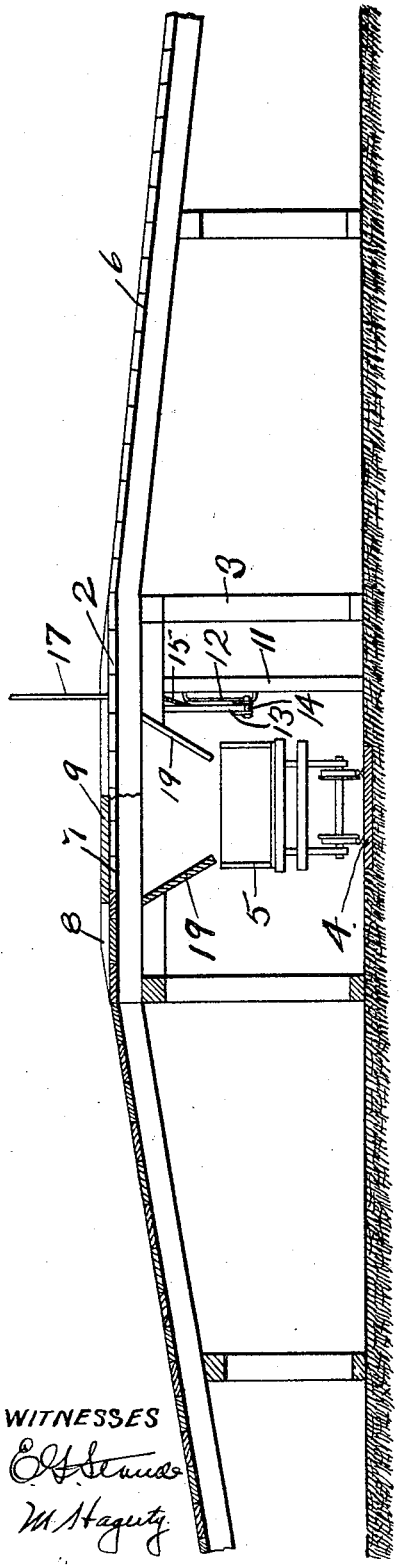
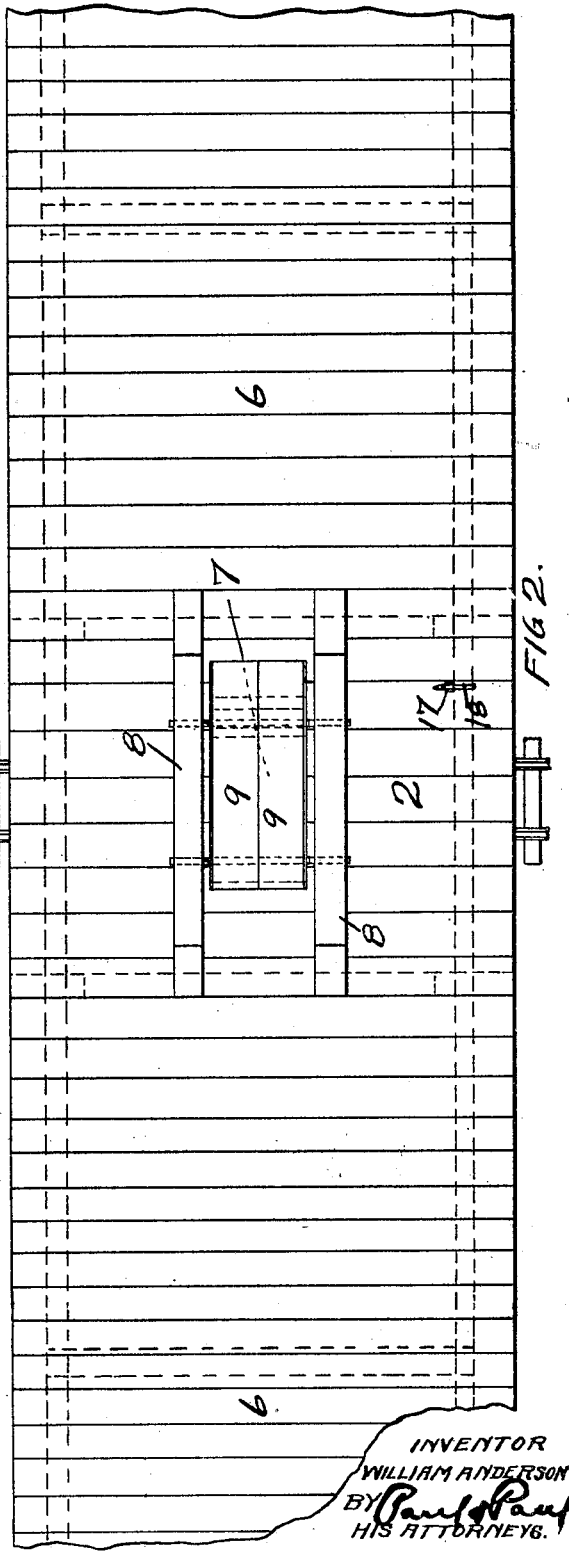
WITNESSES
INVENTOR
WILLIAM ANDERSON
BY Paul & Paul
HIS ATTORNEYS.

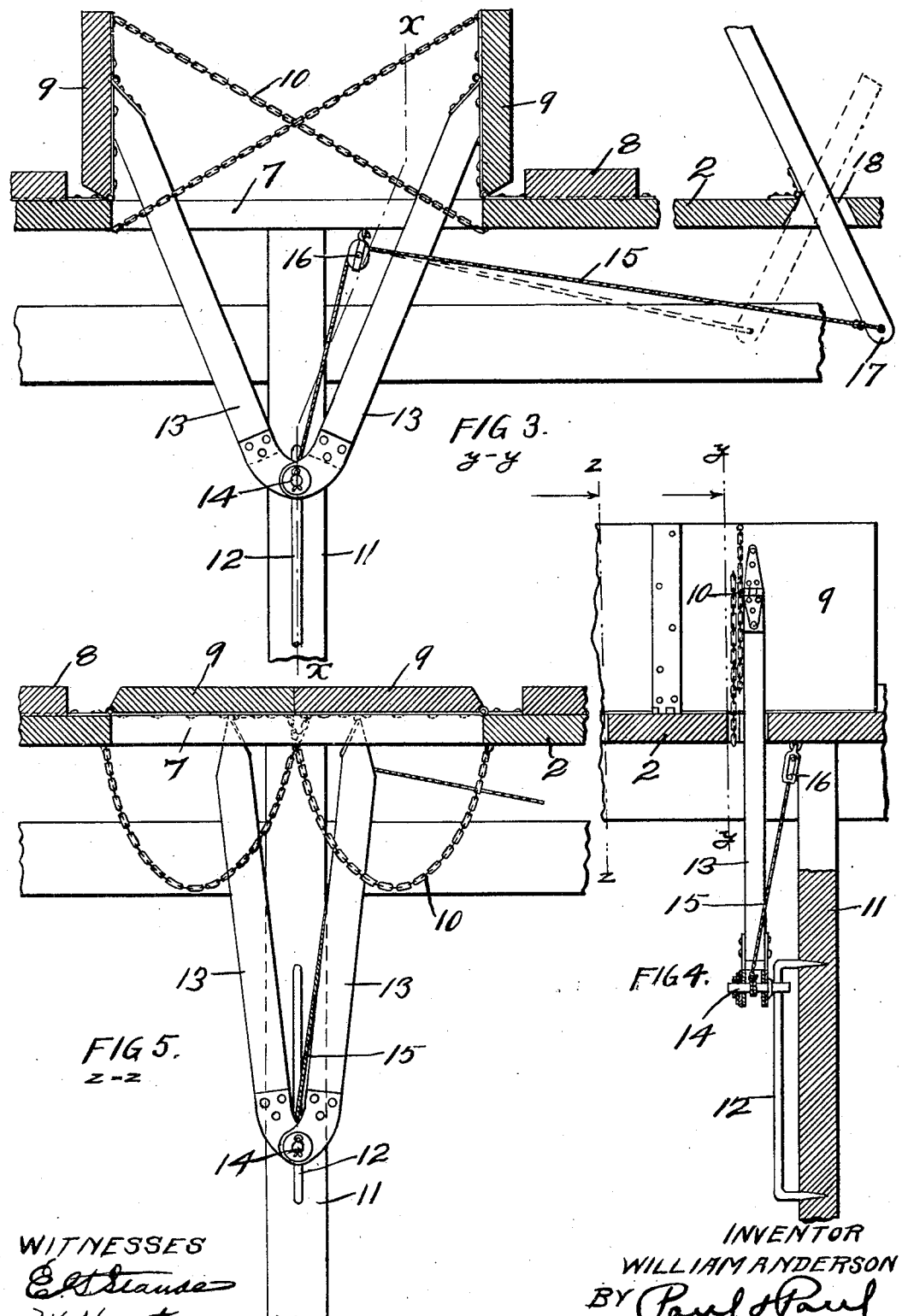

No. 784,465.
Patented March 7, 1905.

UNITED STATES PATENT OFFICE.

WILLIAM ANDERSON, OF HOFFMAN, MINNESOTA.

DUMPING-TRAP.

SPECIFICATION forming part of Letters Patent No. 784,465, dated March 7, 1905.

Application filed December 19, 1903. Serial No. 185,856.

*To all whom it may concern:*

Be it known that I, WILLIAM ANDERSON, of Hoffman, county of Grant, and State of Minnesota, have invented certain new and useful Improvements in Dumping-Traps, of which the following is a specification.

My invention relates to dumping or trap devices for cars used in connection with an elevated platform through which a load is dumped from a wagon into a car beneath.

The object of the invention is to provide improved means for easily and quickly operating the doors of a trap to open and close the same.

Other objects of the invention will appear from the following detailed description.

The invention consists generally in various constructions and combinations, all as hereinafter described, and particularly pointed out in the claim.

In the accompanying drawings, forming part of this specification, Figure 1 is a side elevation, partially in section, of a dumping-platform with my invention applied thereto. Fig. 2 is a plan view of the same. Fig. 3 is a detailed sectional view showing the doors in their open position and the means for operating the same on line $y$ $y$ of Fig. 4. Fig. 4 is a side view in section of a portion of the trap device, showing the doors open, taken substantially on the line $x$ $x$ of Fig. 3. Fig. 5 is a sectional view of the device, showing the doors in their closed position on line $z$ $z$ of Fig. 4.

In the drawings, 2 represents a platform supported at a suitable elevation upon posts 3 above a track 4, whereon a car 5 is shown in position to receive the load. Suitable driveways or approaches 6 are provided upon each side of the dumping-platform. An opening 7 is provided in said platform through which the load is discharged from the wagon standing upon timbers 8, and said opening is normally closed by doors 9, hinged on one side to said platform and arranged to swing toward each other to a horizontal position, as indicated in Fig. 5.

Chains 10 are connected to the said doors and platform to limit the outward swinging movement of the doors when they are opened preparatory to the dumping operation. Beneath the discharge-opening, at one side thereof, is an upright post 11, whereon a guide-rod 12 is supported.

13 represents bars that are pivotally connected at their upper ends, respectively, to the doors 9, their lower ends being mounted on a common pivot 14, that is slidably supported at one end on the rod 12. A rope 15 is connected to the pivot 14 and passes over a pulley-block 16 to the lower end of an operating-lever 17, that projects through a slot 18 in the dumping-platform and is pivotally supported thereon. The upper end of the lever 17 extends a sufficient distance above the platform to enable the operator to conveniently grasp the same for the purpose of swinging it to raise the bars 13 and open the doors. When the doors are raised, the discharge-opening will be exposed and the wagon-load of gravel or other material may be dumped into the car beneath, being guided by fixed guide-boards or shields 19, that are suspended beneath the dumping-platform on each side of the opening therein. The load having been discharged, the operating-lever is released and the bars 13 will return by gravity to their normal depressed position and automatically close the trap-doors. Another wagon may then be driven onto the platform and the dumping operation repeated.

I claim as my invention—

A dumping-platform comprising a horizontal middle section having inclined approaches on two sides and a centrally-arranged elongated discharge-opening, doors hinged at one of their longitudinal edges to the corresponding edges of said opening and adapted to swing toward one another down to a horizontal position to close said opening, stay-chains connecting said doors and platform and limiting the outward swinging movement of the former, bars hinged at their upper ends to the ends of said doors near their free longitudinal edges and arranged to lift said doors from a horizontal to a vertical position, a pivot-pin whereon the lower ends of both said bars are mounted, a vertical guide-rod whereon one end of said pin is slidably mounted, and a lever mounted on said platform and having an operative connection with said pivot-pin to raise said bars and lift said doors to a vertical open position or allow them to drop by gravity to a closed position, substantially as described.

In witness whereof I have hereunto set my hand this 1st day of December, 1903.

WILLIAM ANDERSON.

In presence of—
 ERNEST S. GAIL,
 L. L. DODGE.